(12) United States Patent
Ishii

(10) Patent No.: US 9,377,144 B2
(45) Date of Patent: Jun. 28, 2016

(54) RELEASE TOOL FOR QUICK CONNECTOR

(75) Inventor: Tsubasa Ishii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 445 days.

(21) Appl. No.: 12/706,716

(22) Filed: Feb. 17, 2010

(65) Prior Publication Data

US 2010/0213702 A1 Aug. 26, 2010

(30) Foreign Application Priority Data

Feb. 25, 2009 (JP) .................................. 2009-042161

(51) Int. Cl.
*F16L 37/00* (2006.01)
*F16L 37/098* (2006.01)

(52) U.S. Cl.
CPC .......... *F16L 37/0982* (2013.01); *F16L 37/0987* (2013.01)

(58) Field of Classification Search
CPC ..... F16L 37/08; F16L 37/0982; F16L 37/096; F16L 37/098
USPC ......... 285/39, 308, 313, 321, 319, 89; 29/280
See application file for complete search history.

(56) References Cited

U.S. PATENT DOCUMENTS

| | | | | |
|---|---|---|---|---|
| 2,021,241 A * | 11/1935 | Mall | ....................... | F16B 21/16 15/410 |
| 4,804,213 A * | 2/1989 | Guest | ............................ | 285/308 |
| 4,946,205 A * | 8/1990 | Washizu | ............. | F16L 37/0987 285/148.13 |
| 5,187,851 A * | 2/1993 | Klinger | ........................... | 29/237 |
| 5,226,230 A * | 7/1993 | Klinger | ........................... | 29/237 |
| 5,803,512 A * | 9/1998 | Hollnagel | ....................... | 285/319 |
| 6,186,561 B1 * | 2/2001 | Kaishio et al. | ................ | 285/319 |
| 6,857,663 B2 * | 2/2005 | Nagata et al. | ................... | 285/81 |

FOREIGN PATENT DOCUMENTS

| | | |
|---|---|---|
| GB | 1066637 | 4/1967 |
| JP | 62-80092 | 4/1987 |
| JP | 62-167996 | 7/1987 |
| JP | 10-26342 | 1/1998 |
| JP | 11-201355 | 7/1999 |
| JP | 2000-329278 | 11/2000 |
| JP | 2002-168386 | 6/2002 |
| JP | 2004-232829 | 8/2004 |
| JP | 2005-121101 | 5/2005 |

* cited by examiner

*Primary Examiner* — Aaron Dunwoody
(74) *Attorney, Agent, or Firm* — Mori & Ward, LLP

(57) ABSTRACT

A quick connector includes a female member and a male member. The male member includes a retaining member to connect the male member and the female member. The retaining member includes an operated portion provided at an extending end of the extending portion and a claw portion. The female member includes a window portion with which the claw portion of the retaining member comes into engagement. The engagement is releasable by elastically deforming the operated portion of the retaining member toward the axis line of the male member. A release tool includes at least one operating portion which is configured to come into contact with the at least one operated portion of the retaining member to press the at least one operated portion toward the axis line of the male member so as to release connection between the male member and the female member.

13 Claims, 14 Drawing Sheets

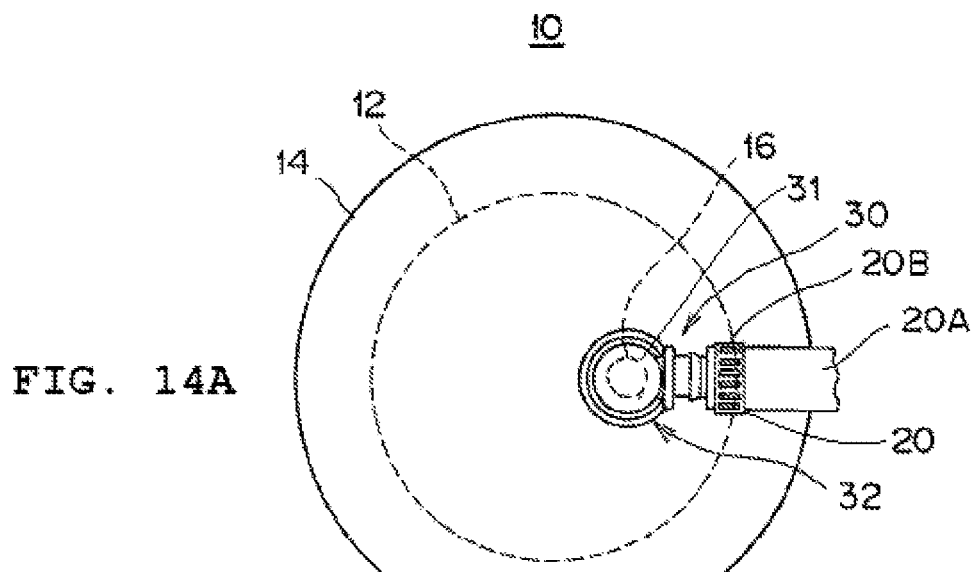
FIG. 14A
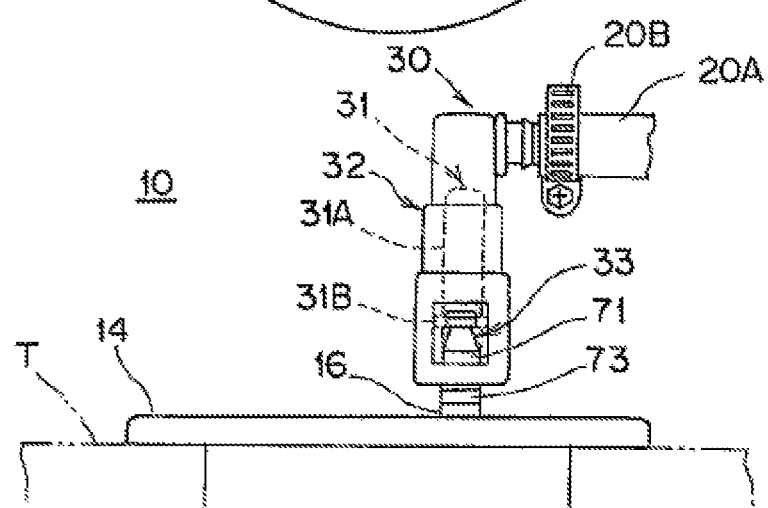
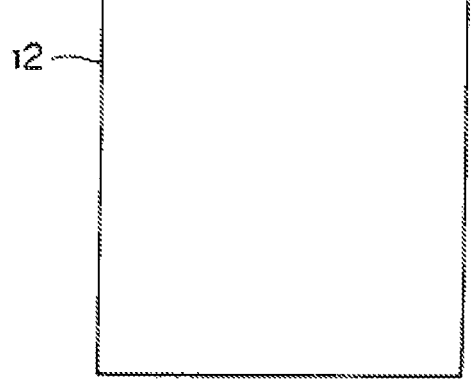
FIG. 14B

RELEASE TOOL FOR QUICK CONNECTOR

CROSS-REFERENCE TO RELATED APPLICATIONS

The present application claims priority under 35 U.S.C. §119 to Japanese Patent Application No. 2009-042161, filed Feb. 25, 2009. The contents of this application are incorporated herein by reference in their entirety.

BACKGROUND OF THE INVENTION

1. Field of the Invention

The present invention relates to a release tool for a quick connector.

2. Discussion of the Background

Quick connectors have been known as a type of piping connector for use in coupling hoses or pipes for conveying various fluids (e.g., see Japanese Patent Application Publication (KOKAI) No. 11-201355).

A quick connector includes a female member forming an outer cylinder, a pipe-shaped male member to be inserted into the female member, and a retaining member for connecting the male member and the female member. Specifically, the male member includes an annular flange portion around the outer periphery thereof; the retaining member is attached to the flange portion of the male member, and includes extending portions which extend from the flange portion in the opposite direction from the tip of the male member and which is elastically deformable toward and away from the axis line of the male member, operated portions provided at the extending ends of these extending portions, and claw portions provided on the extending portions at positions closer to the flange portion than the operated portions. Inserting the male member into the female member with worker's hands causes the claw portions of the retaining member provided on the male member to engage with window portions of the female member, thus connecting the male member and the female member.

On the other hand, pressing the operated portions of the retaining member from outside with worker's fingers causes the operated portions to elastically deform toward the axis of the male member and causes the claw portions to be detached from the window portions, thus making it possible to extract the male member from the female member.

SUMMARY OF THE INVENTION

According to one aspect of the present invention, a release tool for a quick connector is provided. The quick connector includes a female member forming an outer cylinder; a pipe-shaped male member to be inserted into the female member, the male member including an annular flange portion around an outer periphery of the male member; and a retaining member to be attached to the flange portion of the male member to connect the male member and the female member. The retaining member includes an extending portion extending from the flange portion in a direction opposite to a tip of the male member and being elastically deformable toward and away from an axis line of the male member; an operated portion provided at an extending end of the extending portion; and a claw portion provided on the extending portion at a position closer to the flange portion than the operated portion. The female member includes a window portion with which the claw portion of the retaining member comes into engagement in a state where the operated portion of the retaining member is located outside the female member when the male member is inserted into the female member. The engagement is releasable by elastically deforming the operated portion of the retaining member toward the axis of the male member. The release tool includes at least one operating portion configured to come into contact with the at least one operated portion of the retaining member to press the at least one operated portion toward the axis line of the male member so as to release connection between the male member and the female member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 14A is a top view showing yet another quick connector to which the release tool according to an embodiment of the present invention is applied, along with peripheral structures, and FIG. 14B is a side view thereof.

DESCRIPTION OF THE EMBODIMENTS

Hereinafter, embodiments of the present invention will be described with reference to the accompanying drawings.

First Embodiment

Figure 1A:
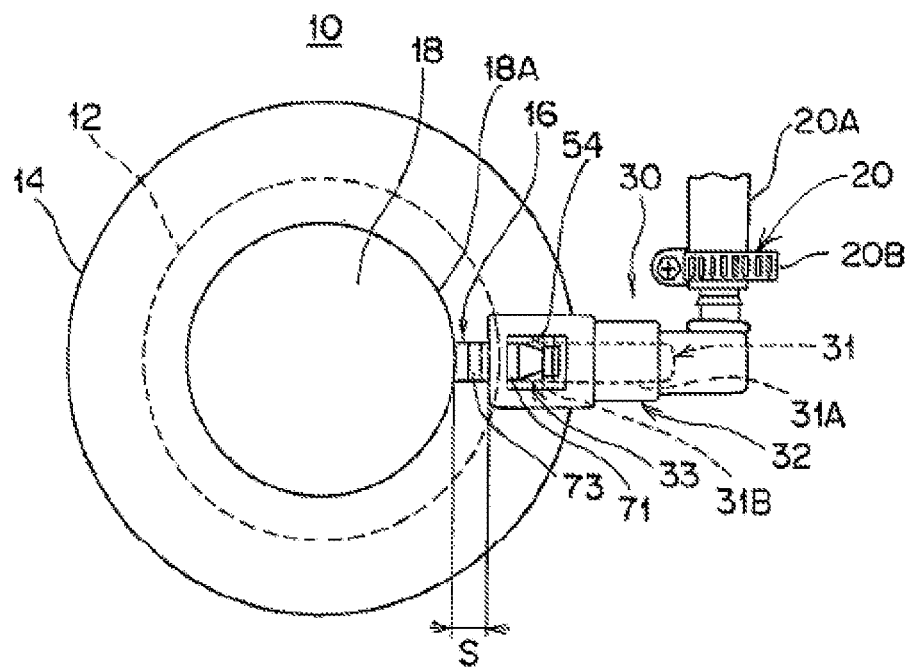
FIG. 1A is a top view showing a quick connector to which a release tool of the present invention is applied, along with peripheral structures.
Figure 1B:
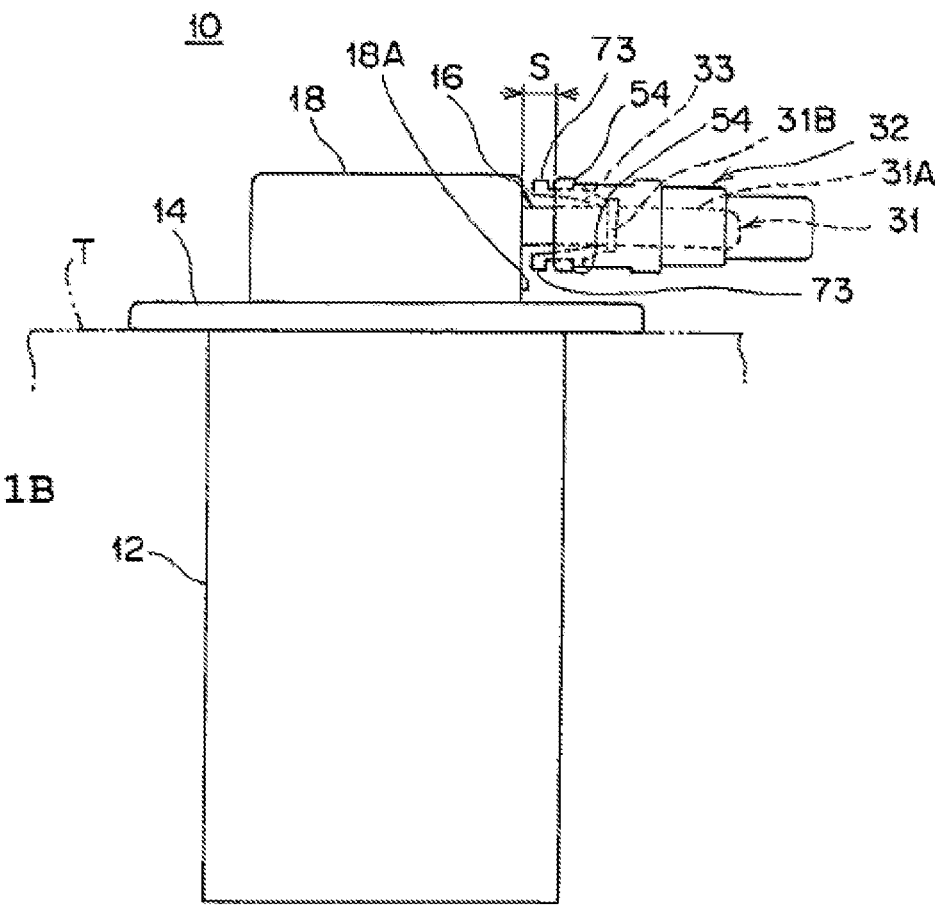
FIG. 1B is a side view thereof.

FIG. 1 is a view showing a quick connector to which a release tool according to a first embodiment of the present invention is applied, along with peripheral structures. FIG. 1A shows a top view, and FIG. 1B shows a side view. These drawings show an aspect in which a quick connector 30 is applied to the installation of piping of a fuel pump 10.

This fuel pump 10 is an in-tank fuel pump to be attached to a fuel tank of a two-wheeled motor vehicle, and includes a pump body 12 and a flange portion 14 provided on this pump body 12. The fuel pump 10 is connected to a fuel tank by inserting the pump body 12 into the tank through a pump through hole provided in a top plate forming a top surface T of the fuel tank and fastening the flange portion 14 to the top plate of the fuel tank with fastening members such as bolts.

This fuel pump 10 further includes a fuel pipe (fuel discharge pipe) 16 protruding from the pump body 12. This fuel pipe 16 is connected to another fuel pipe 20 through the quick connector 30. One end of this fuel pipe 20 is connected to a vehicle side, or more specifically, an unillustrated injector (fuel injection portion). In other words, the fuel pump 10 and the injector on the vehicle side are connected through the quick connector 30. Accordingly, the removal of this quick connector 30 can isolate the fuel pump 10 from the vehicle body, and makes it possible to remove the fuel tank having this fuel pump 10 attached thereto from the vehicle body.

On the other hand, when the quick connector 30 is in a connected state, fuel in the fuel tank is supplied to the injector included in the vehicle body by the fuel pump 10 and supplied to an engine of the vehicle by this injector.

Here, FIG. 1 shows the case where the fuel pump 10 includes an approximately cylindrical cover portion 18 protruding upward from the flange portion 14. In the case of this configuration, the fuel pipe 16 linearly extends toward a side from a side wall (wall portion) 18A of the cover portion 18, and a tip portion thereof is formed into a male member 31 constituting part of the quick connector 30.

It should be noted that a description will be made in this embodiment on the case where the fuel pump 10 is attached to the top plate of the fuel tank and where the fuel pipe 20 is connected to the fuel pump 10 through the quick connector 30 above the fuel tank, but this is not the only case. For example, a configuration may also be employed in which a pump through hole is formed in a bottom plate of the fuel tank so that the pump body 12 may be inserted into the tank from under the fuel tank, in which the flange portion 14 is connected to the bottom plate of the fuel tank, and in which the fuel pipe 20 is connected to the fuel pump 10 through the quick connector 30 under the fuel tank.

Figure 2:
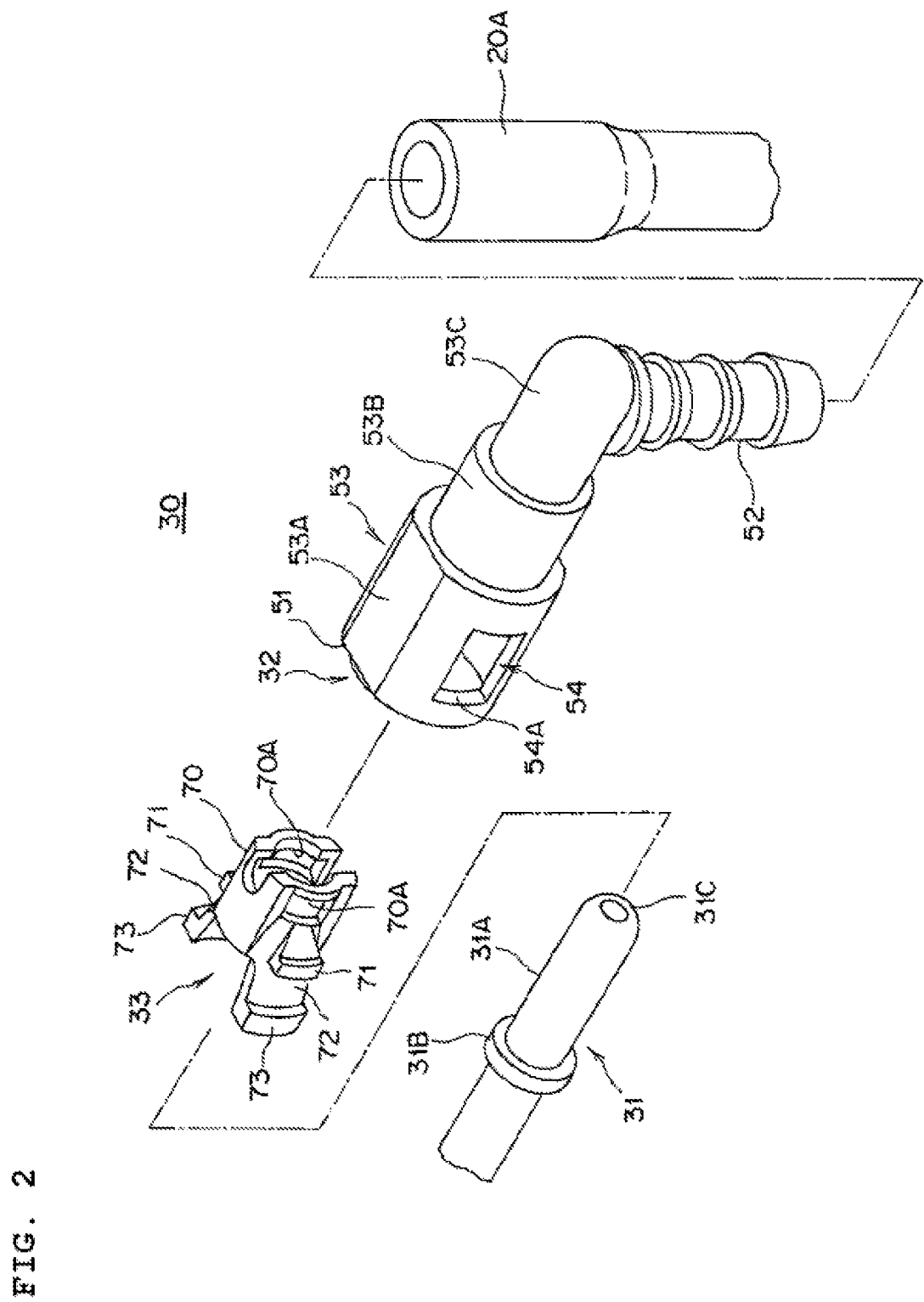
FIG. 2 is an exploded perspective view showing the quick connector along with the peripheral structures.
Figure 3:
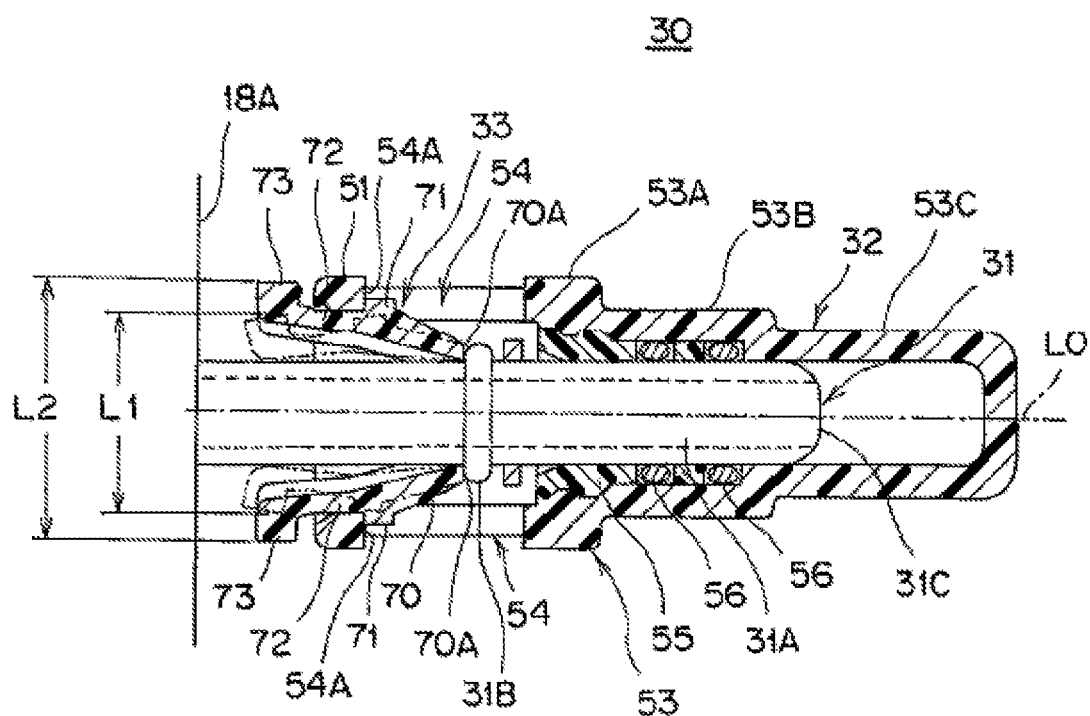
FIG. 3 is a side cross-sectional view of the quick connector.

FIG. 2 is an exploded perspective view showing the quick connector 30 along with peripheral structures. FIG. 3 is a side cross-sectional view of the quick connector 30.

The quick connector 30 includes the male member 31 provided on the fuel pump 10 side, a female member (also referred to as a connector body) 32 forming an outer cylinder into which this male member 31 is inserted, and a retaining member (also referred to as a retainer) 33 for connecting the male member 31 and the female member 32 so that the male member 31 may not be disconnected from the female member 32. Here, to the female member 32, a resin tube 20A is attached and the fuel pipe 20 on the vehicle body side is connected through this resin tube 20A. It should be noted that in FIG. 1A, reference numeral 20B denotes a clip for connecting the resin tube 20A to the female member 32.

As shown in FIG. 2, the male member 31 is a pipe-shaped member serving as a component to which the female member 32 is connected, and is a resin pipe obtained by integrally forming a linear pipe portion 31A and an annular flange portion 31B provided around the outer periphery of the linear pipe portion 31A by resin molding. The linear pipe portion 31A has a smaller diameter than the female member 32 and linearly extends from the fuel pump 10. This flange portion 31B is formed at a position which is at a predetermined distance from a tip 31C of the male member 31, and formed to have an outer diameter larger than the outer diameter of the pipe portion 31A and smaller than the diameter of an insertion opening end portion 51 which is an opening on one end side of the female member 32.

As shown in FIGS. 2 and 3, the female member 32 is formed to have a larger diameter than the male member 31, and is a cylindrical member into which the male member 31 is attachably and detachably inserted through the retaining member 33. This female member 32 has the insertion opening end portion 51 at one end and a nipple portion 52 (see FIG. 2) at the other end. The insertion opening end portion 51 has an inner diameter which allows the tip 31C of the male member 31 and the retaining member 33 to be inserted therein. The nipple portion 52 functions as a tube connecting portion (fuel pipe connecting portion). The female member 32 further has, between the insertion opening end portion 51 and the nipple portion 52, a cylindrical housing portion 53 in which the male member 31 and the retaining member 33 inserted from the insertion opening end portion 51 are housed. The female member 32 is a resin component obtained by integrally forming these by resin molding.

Specifically, the insertion opening end portion 51 and the housing portion 53 are coaxially continuous so that the male member 31 inserted from the insertion opening end portion 51 may be inserted straight and that the tip of the male member 31 may be inserted to the back of the housing portion 53, as shown in FIG. 3. The retaining member 33 is attached to the flange portion 31B of the male member 31 to be inserted into the housing portion 53 integrally with the male member 31.

This housing portion 53 has a pair of window portions 54, 54 with which a pair of left and right claw portions 71, 71 provided in the retaining member 33 engage (see FIG. 3). Specifically, when the retaining member 33 is inserted together with the male member 31 into the housing portion 53, the pair of claw portions 71, 71 of the retaining member 33 enter the window portions 54, 54 to be locked on locking surfaces 54A, 54A on one end sides (insertion opening end portion 51 sides) of the window portions 54, 54 as shown in FIG. 3, thus being held so that the retaining member 33 may not be detached from the housing portion 53.

This housing portion 53 has an outer diameter which decreases from the insertion opening end portion 51 toward the nipple portion 52 in stages. Specifically, the housing portion 53 has a large-diameter cylindrical portion 53A continuous with the insertion opening end portion 51 and formed in a cylindrical shape having a largest diameter, an intermediate-diameter cylindrical portion 53B formed to have a smaller diameter than the large-diameter cylindrical portion 53A, and a small-diameter cylindrical portion 53C formed to have a smaller diameter than the intermediate-diameter cylindrical portion 53B, which are integral with each other.

This large-diameter cylindrical portion 53A is a portion for housing the flange portion 31B of the male member 31 and a body portion 70 and the claw portions 71, 71 of the retaining member 33, and has a largest inner diameter as well as the largest outer diameter. In the peripheral wall of the large-diameter cylindrical portion 53A, the pair of window portions 54, 54 with which the pair of claw portions 71, 71 of the retaining member 33 engage are formed 180 degrees apart around the axis line L0 (axis line of a portion (housing portion 53) except for the nipple portion 52) of the female member 32.

Here, in this quick connector 30, since the male member 31, the female member 32 (portion (housing portion 53) except for the nipple portion 52), and the retaining member 33 are disposed coaxially, the respective axis lines of the members 31, 32, and 33 are coincident with each other. The common axis line of these will hereinafter be expressed as the axis line L0.

The intermediate-diameter cylindrical portion 53B has smaller inner and outer diameters than the large-diameter cylindrical portion 53A, and holds a bush 55 (see FIG. 3) and ring-shaped seal members 56, 56 (see FIG. 3) interposed between the inner circumferential surface thereof and the outer circumferential surface of the pipe portion 31A of the male member 31. The inner circumferential surface of the bush 55 is formed to open wider with decreasing distance to one side (large-diameter cylindrical portion 53A side) in the shape of a funnel so as to facilitate the insertion of the tip of the male member 31. The seal members 56, 56 ensure sufficient water-tightness and air-tightness between the male member 31 and the female member 32.

The small-diameter cylindrical portion 53C has even smaller inner and outer diameters than the intermediate-diameter cylindrical portion 53B, and houses and holds the tip of the male member 31. Specifically, the small-diameter cylindrical portion 53C of the female member 32 holds the tip 31C of the male member 31, and this stabilizes the attitude of the male member 31 with respect to the female member 32, thus stabilizing the connection of the quick connector 30.

As shown in FIG. 3, the retaining member 33 includes the body portion 70 to be attached to the flange portion 31B of the male member 31, a pair of extending portions 72, 72 extending from the flange portion 31B in the opposite direction from the tip 31C of the male member 31, and the pair of claw portions 71, 71 and a pair of operated portions 73, 73 provided on the pair of extending portions 72, 72. The retaining member 33 is a resin component obtained by integrally forming these by resin molding.

The body portion 70 is formed to have an approximately C-shaped cross section so that the diameter thereof can be increased and decreased by elastic deformation (see FIG. 2). Accordingly, when the opening side of the approximately C-shaped cross section of the body portion 70 is pressed against the male member 31, the body portion 70 is expanded by elastic deformation to fit over the outer periphery of the male member 31, thus pinching the male member 31 with elastic force. Since the body portion 70 holds the male member 31 with elastic force in this way, the detachment of the male member 31 from the body portion 70 is also easy. In other words, the retaining member 33 can be easily attached to and detached from the male member 31.

This body portion 70 further has a pair of window portions 70A, 70A which engage with the flange portion 31B in the state of holding the male member 31. These window portions 70A, 70A prevent the retaining member 33 from moving in the axial direction of the male member 31. Thus, the retaining member 33 is positioned with respect to the male member 31. It should be noted that the retaining member 33 can rotate in the circumferential direction of the male member 31 even in a state where the window portions 70A, 70A is in engagement with the flange portion 31B, and that the mounting angle of the retaining member 33 with respect to the male member 31 is not limited.

The pair of extending portions 72, 72 are provided 180 degrees apart around the axis line L0 of the retaining member 33 and formed in the shape of inclined plates which have a diameter increasing such that the distances from the inner circumferential surfaces thereof to the axis line L0 increases with increasing distance from the body portion 70, and can elastically deform toward and away from the axis line L0.

On the base end sides (body portion 70 sides) of these extending portions 72, 72, the aforementioned pair of claw portions 71, 71 is formed to protrude in directions (also referred to as centrifugal directions) away from the axis line L0. The claw portions 71, 71 move toward or away from the axis line L0 in accordance with the elastic deformation of the extending portions 72, 72.

On the other hand, on the extending end sides of these extending portions 72, 72, the pair of operated portions 73, 73 is formed to protrude in directions (also referred to as centrifugal directions) away from the axis line L0. The operated portions 73, 73 also move toward or away from the axis line L0 in accordance with the elastic deformation of the extending portions 72, 72.

Specifically, the pair of claw portions 71, 71 and the pair of operated portions 73, 73 is provided on the pair of extending portions 72, 72 apart from each other along the axis line L0 of the retaining member 33, respectively. Moving the pair of operated portions 73, 73 toward the axis line L0 by pressing causes the pair of extending portions 72, 72 having these operated portions 73, 73 to elastically deform toward the axis line L0 such that the diameter of the extending portions 72, 72 decreases, and also causes the pair of claw portions 71, 71 provided on these extending portions 72, 72 to move toward the axis line L0.

Accordingly, when the pair of claw portions 71, 71 are in engagement with the window portions 54, 54 of the female member 32 (see FIG. 3), pressing the pair of operated portions 73, 73 toward the axis line L0 releases the engagement between the pair of claw portions 71, 71 and the window portions 54, 54 of the female member 32, and makes it possible to extract the retaining member 33 and the male member 31 from the female member 32, i.e., release the connection of the quick connector 30. In other words, the pair of operated portions 73, 73 functions as operators for releasing the connection of the quick connector.

Here, as shown in FIG. 3, the pair of operated portions 73, 73 protrude radially outward of the pair of claw portions 71, 71. More specifically, in a state where the pair of claw portions 71, 71 are respectively in engagement with the window portions 54, 54 of the female member 32, the pair of operated portions 73, 73 protrude radially outward of the inner diameter of the insertion opening end portion 51 of the female member 32. Accordingly, when the male member 31 having the retaining member 33 attached thereto is inserted into the female member 32, it is possible to restrain insertion beyond the position where this pair of operated portions 73, 73 come into contact with the insertion opening end portion 51 of the female member 32.

This restraint position is the position where the pair of claw portions 71, 71 engages with the window portions 54, 54 of the female member 32, respectively. The pair of operated portions 73, 73 also functions as insertion depth limitation members for limiting the insertion depth.

It should be noted, however, that this pair of operated portions 73, 73 do not protrude outward (radially outward) of the insertion opening end portion 51 of the female member 32 to be accommodated within the outer diameter of the female member 32 in a state (state where the quick connector is connected) where the pair of claw portions 71, 71 are in engagement with the window portions 54, 54 of the female member 32, respectively, as show in FIG. 3.

A connection procedure for connecting this quick connector 30 includes: a first connection procedure to be performed in a state where the retaining member 33 is attached to the male member 31; and a second connection procedure to be performed in a state where the retaining member 33 is attached to the female member 32.

Specifically, the first connection procedure is performed by: inserting the tip 31C of the male member 31 into the housing portion 53 of the female member 32 together with the retaining member 33 with the window portions 70A, 70A of the retaining member 33 fitted to the flange portion 31B of the male portion 31; and passing the tip 31C of the male member 31 through the large-diameter cylindrical portion 53A and the intermediate-diameter cylindrical portion 53B of the female member 32 to fit the tip 31C into the small-diameter cylindrical portion 53C with almost no clearance therebetween.

In this state where the tip 31C of the male member 31 is placed and fitted into the small-diameter cylindrical portion 53C, the claw portions 71, 71 of the retaining member 33 attached to the male member 31 engage with the window portions 54, 54 of the female member 32. Accordingly, the male member 31, the retaining member 33, and the female member 32 are coupled, and the quick connector 30 is brought to a connected state.

On the other hand, the second connection procedure is performed by: inserting the tip 31C of the male member 31 into the housing portion 53 of the female member 32 with the claw portions 71, 71 of the retaining member 33 engaged with the window portions 54, 54 of the female member 32; and passing the tip 31C of the male member 31 through the large-diameter cylindrical portion 53A and the intermediate-diameter cylindrical portion 53B of the female member 32 to fit the tip 31C into the small-diameter cylindrical portion 53C with almost no clearance therebetween.

When the tip 31C of the male member 31 is inserted into the housing portion 53, the male member 31 is inserted into the retaining member 33 held in the housing portion 53. In a state where the tip 31C of the male member 31 is passed through the retaining member 33 to be fitted into the small-diameter cylindrical portion 53C, the flange portion 31B of the male member 31 engages with the window portions 70A, 70A of the retaining member 33. Accordingly, the male member 31, the retaining member 33, and the female member 32 are coupled, and the quick connector 30 is brought to a connected state. Thus, a connection procedure of the quick connector 30 may be either of the above-described two procedures.

A release procedure for releasing the connection of the quick connector 30 is performed by pressing the pair of operated portions 73, 73 provided on the retaining member 33 toward the axis line L0. Specifically, pressing the pair of operated portions 73, 73 toward the axis line L0 when the quick connector 30 is in a connected state causes the pair of claw portions 71, 71 of the retaining member 33 to move toward the axis line L0 (radially inward), and therefore releases the engagement of the pair of claw portions 71, 71 with the pair of window portions 54, 54 of the female member 32. In this state, applying operating force in the direction in which the male member 31 is extracted from the female member 32 causes the male member 31 to be extracted from the female member 32, thus releasing the connection of the quick connector 30.

As shown in FIG. 3, the pair of operated portions 73, 73 of the quick connector 30 are formed to be small so as not to protrude outward of the female member 32, and is therefore hard to operate with fingers. In particular, when the side wall (wall portion) 18A exists in the vicinity of the male member 31 of the quick connector 30 as shown in FIG. 1, since the space S between this side wall 18A and the female member 32 of the quick connector 30 is tight, it is hard to reach into this space S to operate the operated portions 73, 73 with fingers.

Accordingly, in this embodiment, a release tool 100 is provided which can be inserted into the space S and can come into contact with the operated portions 73, 73 of the retaining member 33 to press the operated portions 73, 73 toward the axis line L0 of the male member 31. The connection of the quick connector 30 can be released by operating the operated portions 73, 73 with this release tool 100. This release tool 100 will be described in detail below.

Figure 4A:
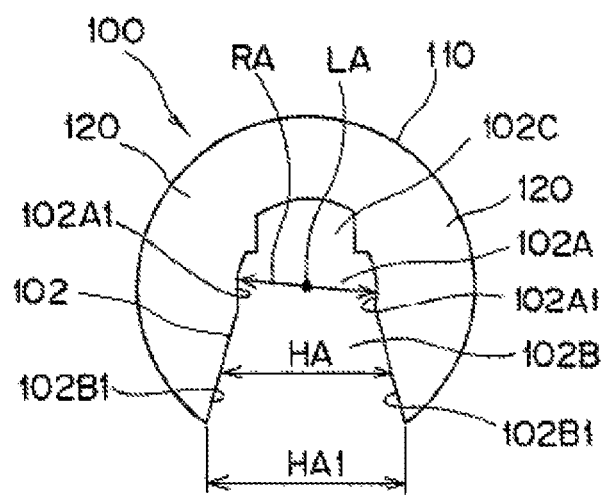
FIG. 4A is a plan view of the release tool.
Figure 4B:
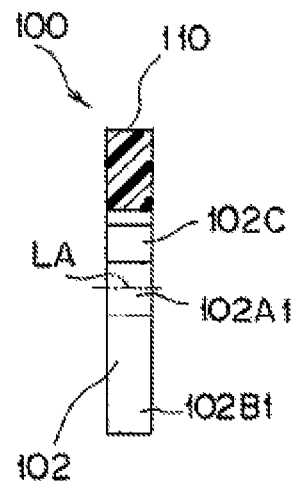
FIG. 4B is a side cross-sectional view thereof.
Figure 4C:
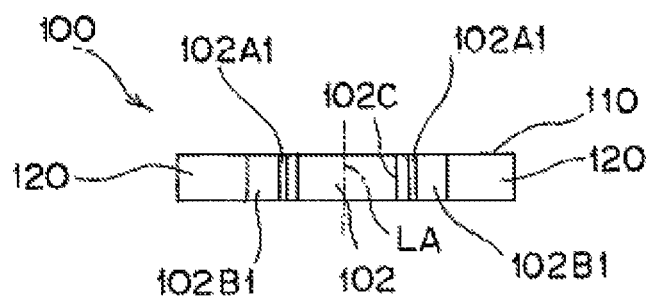
FIG. 4C is a bottom view of FIG. 4A.

FIG. 4 shows a three-view drawing of the release tool 100. FIG. 4A shows a plan view of the release tool 100, FIG. 4B shows a side cross-sectional view thereof, and FIG. 4C shows a bottom view of FIG. 4A.

This release tool 100 includes a release tool body 110 made of an approximately C-shaped plate member having a notched portion 102 opening in one direction, and is formed from resin material. It should be noted that not only resin material but also other material having rigidity may be used to form the release tool 100.

This release tool body 110 has a shape obtained by providing the notched portion 102 in a disk member (disk member having an axis line LA) made of resin. This notched portion 102 is broadly divided into a central opening portion 102A and a guide opening portion 102B. The central opening portion 102A is provided at approximately the center of the release tool body 110, and the guide opening portion 102B is continuous with the central opening portion 102A, and has an opening width HA gradually increasing from the central opening portion 102A toward the outside of the release tool body 110.

This central opening portion 102A is formed in an opening shape which has a diameter RA and which is centered at the central axis line LA of the release tool body 110. This diameter RA is formed to have a length corresponding to the distance L1 (see FIG. 3) between the outer side surfaces of the pair of operated portions 73, 73 in a state (state indicated by two-dot chain lines in FIG. 3) where the operated portions 73, 73 of the retaining member 33 have a decreased diameter and where the claw portions 71, 71 are not in engagement with the window portions 54, 54.

The guide opening portion 102B has inner side surfaces 102B1, 102B1 which are a pair of bilaterally symmetric tapered surfaces inclining such that the opening width HA therebetween gradually decreases toward the central opening portion 102A. The opening width HA1 at the outermost position is formed to be larger than the distance L2 (see FIG. 3) between the outer side surfaces of the pair of operated portions 73, 73 in a state (state indicated by solid lines in FIG. 3) where the operated portions 73, 73 of the retaining member 33 have an increased diameter and where the claw portions 71, 71 are in engagement with the window portions 54, 54 (HA1>L2).

In other words, the guide opening portion 102B is formed to be such an opening that the male member 31 and the retaining member 33 can be inserted into the opening portion 102B even in a state where the operated portions 73, 73 of the retaining member 33 are expanded. Also, the pair of inner side surfaces 102B1, 102B1 of the guide opening portion 102B is formed to be tapered surfaces inclining toward the central opening portion 102A. Accordingly, the guide opening portion 102B can smoothly guide the male member 31 and the retaining member 33 toward the central opening portion 102A.

Figure 5:
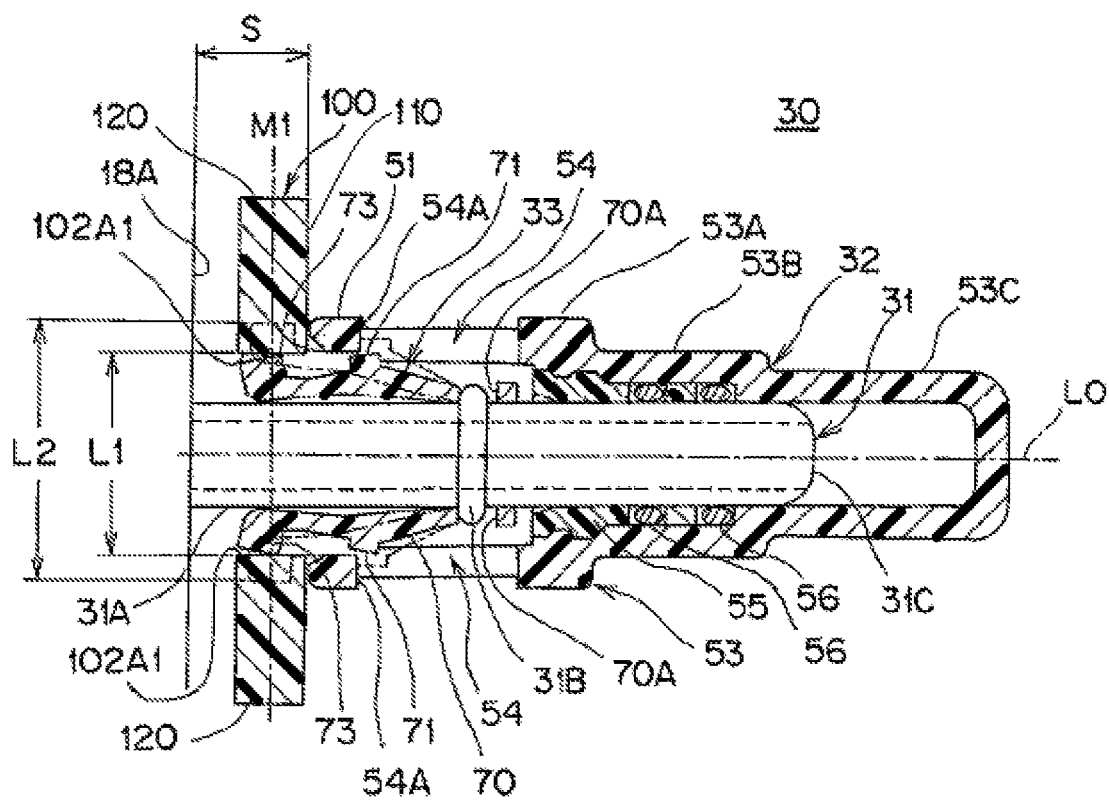
FIG. 5 is a view showing a usage state of the release tool.

FIG. 5 shows a usage state of the release tool 100. Moving the release tool body 110 toward the axis line L0 along a plane M1 (see FIG. 5) perpendicular to the axis line L0 of the male member 31 (moving the release tool body 110 from the far side toward the near side in FIG. 5) causes the operated portions 73, 73 of the retaining member 33 to be guided toward the central opening portion 102A along the inner side surfaces 102B1, 102B1 of the guide opening portion 102B.

In this case, the operated portions 73, 73 of the retaining member 33 are gradually pressed toward the axis line L0 by the inner side surfaces 102B1, 102B1 of the guide opening portion 102B. As a result, as shown in FIG. 5, the operated portions 73, 73 of the retaining member 33 enter the central opening portion 102A of the release tool body 110.

As described previously, the central opening portion 102A is formed in such an opening shape that the operated portions 73, 73 of the retaining member 33 can enter the central opening portion 102A when the operated portions 73, 73 have a diameter decreased to a state where the claw portions 71, 71 and the window portions 54, 54 are not in engagement with each other. Accordingly, as shown in FIG. 5, the pair of inner side surfaces 102A1 and the 102A1 of the central opening portion 102A come into contact with the operated portions 73, 73 of the retaining member 33 to keep the operated portions 73, 73 pressed toward the axis line L0.

In other words, the inner side surfaces 102B1, 102B1 of the guide opening portion 102B function as a pair of first operating portions for pressing the operated portions 73, 73 of the retaining member 33 to a state where the claw portions 71, 71 and the window portions 54, 54 are just about to be brought out of engagement with each other, and the inner side surfaces 102A1, 102A1 of the central opening portion 102A function as a pair of second operating portions for keeping the pair of operated portions 73, 73 pressed by the above-described pair of first operating portions in a state where the claw portions 71, 71 and the window portions 54, 54 are not in engagement with each other.

Thus, a pair of operating portions (first operating portions and second operating portions) are formed which come into contact with the operated portions 73, 73 of the retaining member 33 to gradually press these operated portions 73, 73 to a position where the claw portions 71, 71 and the window portions 54, 54 are brought out of engagement with each other.

Accordingly, pressing (see FIG. 5) this release tool 100 toward the axis line L0 of the male member 31 releases the quick connector 30 from a connected state and makes it possible to extract the male member 31 from the female member 32.

Further, as shown in FIG. 5, the release tool 100 is formed to have a larger diameter than the female member 32 forming the maximum outer diameter of the quick connector 30. Portions of the release tool 100 which protrude outward of this female member 32 can be caused to function as grip portions capable of being gripped with fingers by a worker.

In other words, the release tool body 110 is a portion constituting the aforementioned pair of operating portions which come into contact with the pair of operated portions 73, 73 of the retaining member 33 to press the pair of operated portions 73, 73 toward the axis line L0, and corresponds to the pair of inner side surfaces (102A1, 102B1) of the notched portion 102. The other portions, i.e., peripheral portions 120, 120 extending from the release tool body 110, function as grip portions to be used by a worker to hold the release tool 100.

In this configuration, these grip portions 120, 120 are located on the left and right of the pair of inner side surfaces (102A1, 102B1) constituting the pair of operating portions. Accordingly, a worker can easily perform a release operation while holding the release tool 100 with one hand.

Moreover, in the release tool 100 of this configuration, an opening portion 102C (see FIG. 4A) is also formed on the opposite side of the central opening portion 102A from the guide opening portion 102B. In other words, the notched portion 102 extends beyond the central opening portion 102A.

When the notched length of the notched portion 102 is made long in this way, the portions of the release tool 100 which constitute the pair of operating portions can more easily open by elastic deformation. Accordingly, the force needed to squeeze the release tool 100 into the quick connector 30 side can be made small, and a release operation can be made easier.

As described above, according to this embodiment, the release tool 100 is provided which comes into contact with the operated portions 73, 73 of the retaining member 33 to press the operated portions 73, 73 toward the axis line L0 of the male member 31, and this release tool 100 releases the engagement between the claw portions 71, 71 of the retaining member 33 and the window portions 54, 54 of the female member 32 to enable the male member 31 and the female member 32 to be attached to and detached from each other. Accordingly, even though the operated portions 73, 73 are small, the operated portions 73, 73 can be easily accessed, and the engagement of the quick connector 30 can be easily released.

Further, the retaining member 33 is provided with multiple (pair in this example) operated portions 73, 73, and the release tool 100 includes the pair of inner side surfaces (102A1, 102B1) functioning as multiple (pair in this example) operating portions which come into contact with the multiple (pair in this example) operated portions 73, 73 to press the operated portions 73, 73 toward the axis line L0 of the male member 31, respectively. Accordingly, the operated portions 73 are paired with the operating portions, and all the operated portions 73, 73 can be reliably operated.

Moreover, as shown in FIG. 5, the release tool 100 includes the plate-shaped release tool body 110 insertable toward the axis line L0 of the male member 31 along the plane M1 perpendicular to the axis line L0 of the male member 31, and this plate-shaped release tool body 110 is provided with the pair of operating portions (pair of inner side surfaces 102A1, 102B1). Accordingly, even when the side wall (wall portion) 18A exists in the vicinity of the male member 31 of the quick connector 30 and when the space S between this side wall 18A and the quick connector 30 is tight, the release tool body 110 can be easily inserted into this space S from outside.

In this case, this release tool body 110 can be easily inserted into the space S by moving the release tool body 110 along the side wall 18A of the fuel pump 10. In other words, a release operation of the quick connector 30 can be easily performed by utilizing the side wall 18A of the fuel pump 10. This enables access to the operated portions 73, 73 with the release tool body 110 having a compact and simple structure and makes it possible to easily release the engagement of the quick connector 30.

Further, the operating portions (pair of inner side surfaces 102A1, 102B1) of the release tool 100 include the first operating portions which are tapered surfaces for pressing the operated portions 73, 73 of the retaining member 33 to a state just before disengagement, and the second operating portions for keeping the operated portions 73, 73 pressed by the first operating portions in a disengaged state. Accordingly, engagement can be reliably released by gradually pressing the operated portions 73, 73 of the retaining member 33 by a simple operation.

Moreover, the release tool 100 includes the grip portions 120, 120 extending from the release tool body 110. This can make the release tool 100 easy to hold and can improve the operability of the release tool 100.

Furthermore, the release tool 100 includes the approximately C-shaped release tool body 110 having the notched portion 102 opening in one direction. This notched portion 102 opens so that the male member 31 and the retaining member 33 attached to the male member 31 can be inserted therein when the release tool 100 is moved toward the axis line L0 of the male member 31, and is formed in a shape having operating portions which come into contact with the operated portions 73, 73 of the retaining member 33 to press the operated portions 73, 73 toward the axis line L0 of the male member 31. Accordingly, it is possible to reliably operate the operated portions 73, 73 located in the vicinity of the male member 31 while avoiding the male member 31 constituting part of the fuel pipe 16.

Figure 6A:
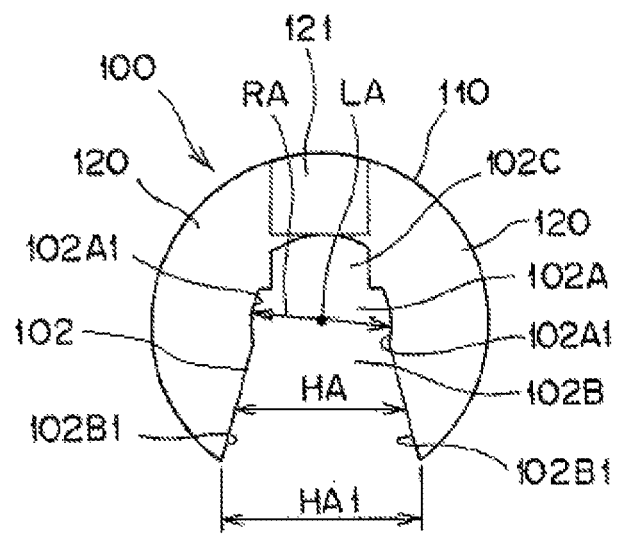
FIG. 6A is a plan view of a release tool according to a modified example.
Figure 6B:
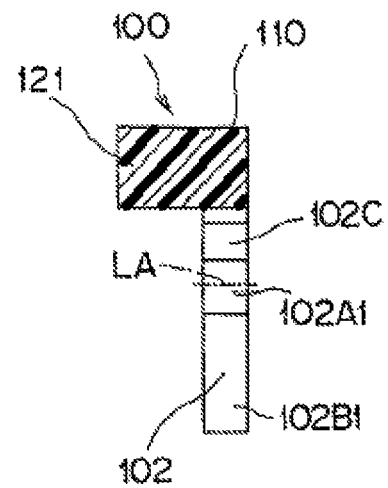
FIG. 6B is a side cross-sectional view thereof.
Figure 6C:
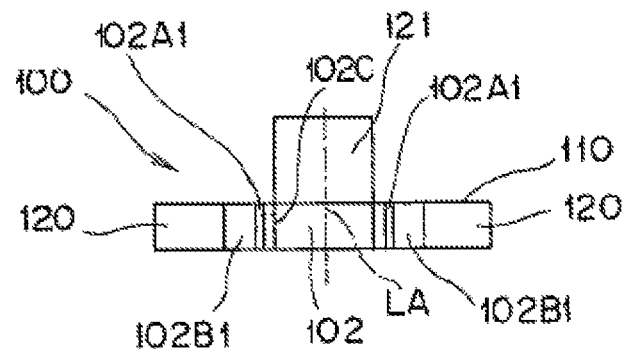
FIG. 6C is a bottom view of FIG. 6A.

It should be noted that though a description has been made in this embodiment on the case where the release tool 100 is formed in the shape of a flat plate, this is not the only case, and design modifications may be made, such as the provision of a grip portion 121 protruding in the thickness direction of the release tool 100 such as shown in FIG. 6. The provision of this grip portion 121 can make the release tool 100 easier to hold. Also, this grip portion 121 comes into contact with the upper surface of the female member 32 when the release tool 100 is squeezed into the quick connector 30 side and thus can limit the squeezed position of the release tool 100 to an appropriate position.

Second Embodiment

Figure 7:
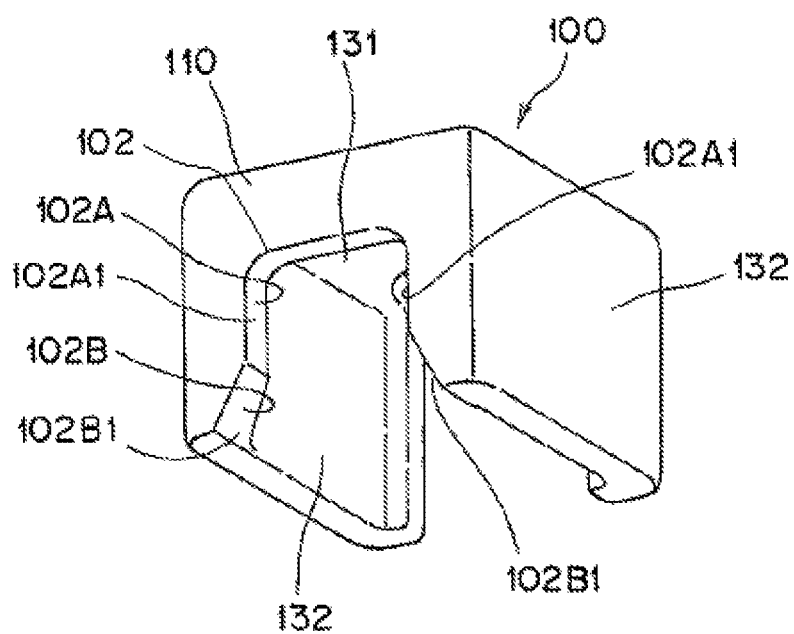
FIG. 7 is a perspective view of a release tool according to a second embodiment.
Figure 8:
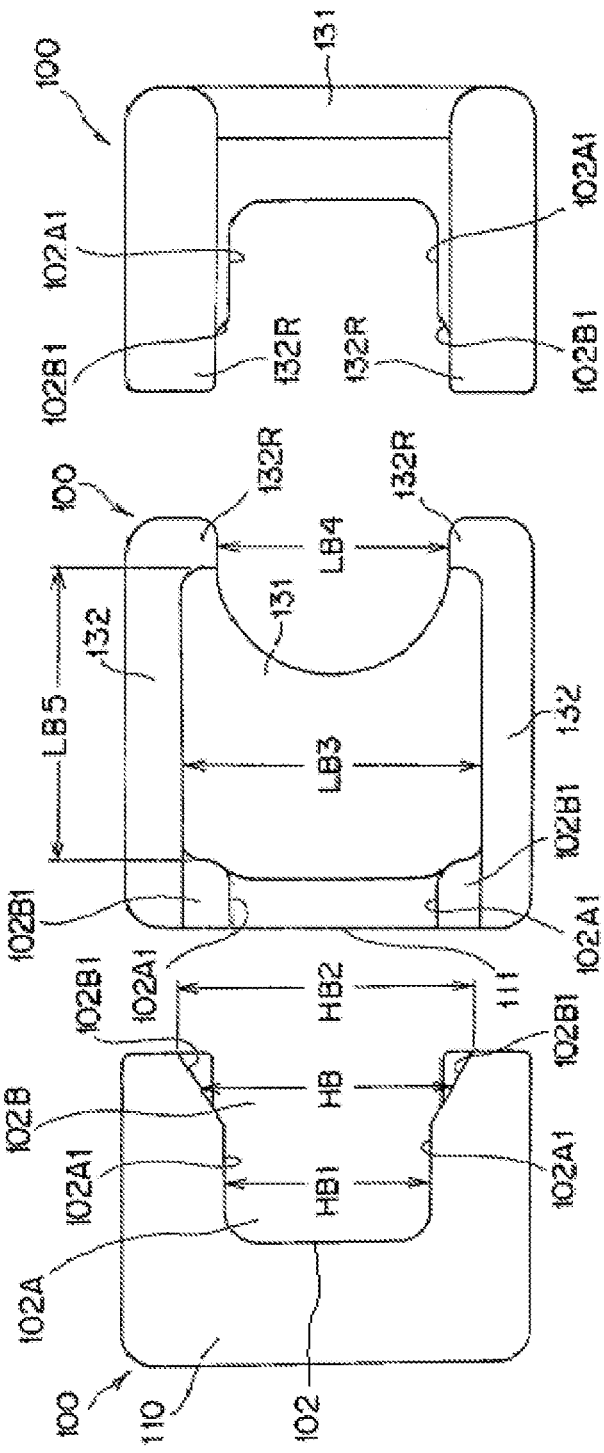
FIG. 8A is a front view of the release tool.
FIG. 8B is a bottom view thereof.
FIG. 8C is a rear view thereof.
FIG. 8D is a side view thereof.

FIG. 7 shows a perspective view of a release tool 100 according to a second embodiment. FIG. 8 shows a four-view drawing of the release tool 100. FIG. 8A shows a front view, FIG. 8B shows a bottom view, FIG. 8C shows a rear view, and FIG. 8D shows a side view. It should be noted that directions such as top, bottom, left, and right approximately correspond to directions such as top, bottom, left, and right in the drawing shown in FIG. 7.

This release tool 100 includes a release tool body 110 formed of an approximately squared U-shaped plate member, and a upper plate 131 and left and right side plates 132, 132 which function as guides for guiding the release tool body 110 along the outer surface of the female member 32. The release tool 100 is formed of a resin component obtained by integrally forming these by resin molding.

The release tool body 110 is formed of an approximately C-shaped plate member having a notched portion 102 opening in one direction (downward direction in FIG. 7), and constitutes the front surface of the release tool 100. This notched portion 102 includes a central opening portion 102A and a guide opening portion 102B. The central opening portion 102A is located at approximately the center of the release tool body 110, and has a constant opening width HB1 (see FIG. 8A). The guide opening portion 102B is continuous with the central opening portion 102A, and has an opening width HB (see FIG. 8A) gradually increasing from the central opening portion 102A toward the outside (bottom) of the release tool body 110.

The opening width HB1 of this central opening portion 102A is formed to have a length corresponding to the distance L1 (see FIG. 3) between the outer side surfaces of the pair of operated portions 73, 73 in a state (state indicated by two-dot chain lines in FIG. 3) where the operated portions 73, 73 of the retaining member 33 have a decreased diameter and where the claw portions 71, 71 are not in engagement with the window portions 54, 54. In other words, the pair of inner side surfaces 102A1, 102A1 of the central opening portion 102A function as a pair of second operating portions for keeping the pair of operated portions 73, 73 in a state where the claw portions 71, 71 and the window portions 54, 54 are not in engagement with each other.

Further, the guide opening portion 102B has inner side surfaces 102B1, 102B1 which are a pair of bilaterally symmetric tapered surfaces inclining such that the opening width HB therebetween gradually decreases toward the central opening portion 102A. The opening width HB1 at the outermost position is formed to be larger than the distance L2 (see FIG. 3) between the outer side surfaces of the pair of operated portions 73, 73 in a state (state indicated by solid lines in FIG. 3) where the operated portions 73, 73 of the retaining member 33 have an increased diameter and where the claw portions 71, 71 are in engagement with the window portions 54, 54 (HB1>L2).

In other words, the pair of inner side surfaces 102B1, 102B1 of the guide opening portion 102B function as a pair of first operating portions for pressing the operated portions 73, 73 of the retaining member 33 to a state where the claw portions 71, 71 and the window portions 54, 54 are just about to be brought out of engagement with each other.

Thus, these first and second operating portions constitute a pair of operating portions which come into contact with the operated portions 73, 73 of the retaining member 33 to gradually press these operated portions 73, 73 to a position where the claw portions 71, 71 and the window portions 54, 54 are brought out of engagement with each other.

Figure 9:
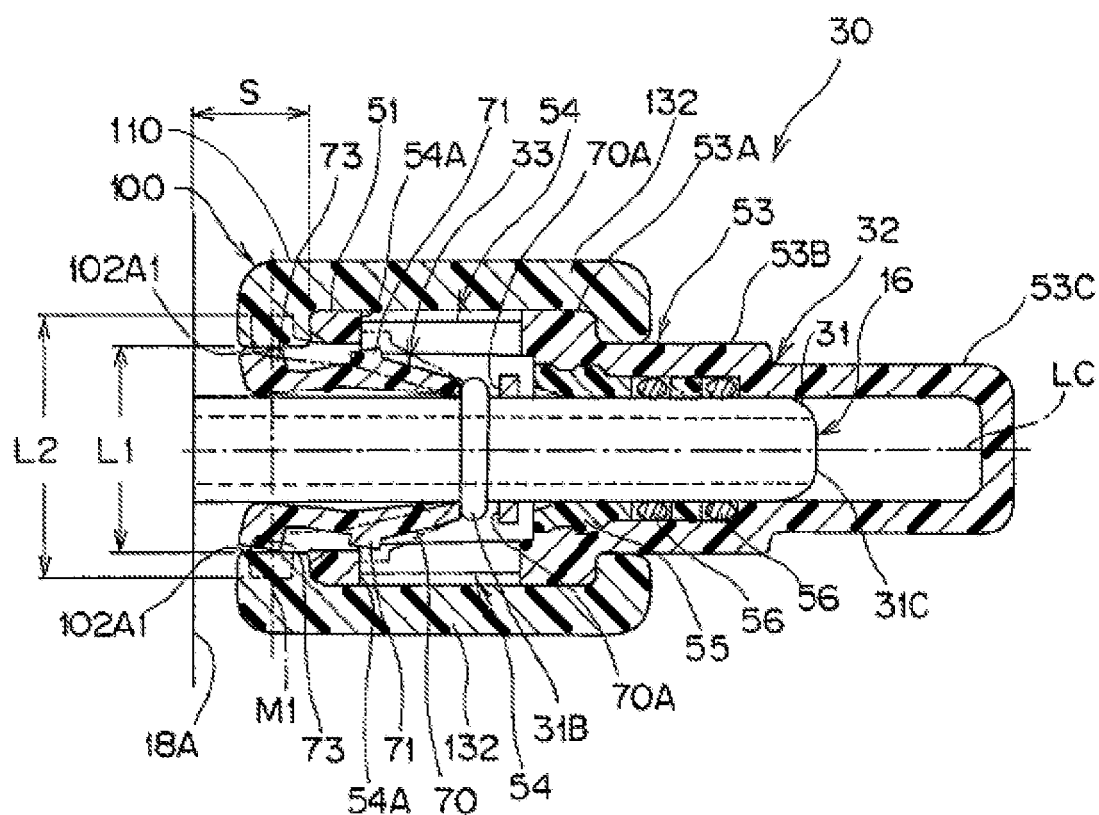
FIG. 9 is a view showing a usage state of the release tool.

FIG. 9 shows a usage state of this release tool 100. It should be noted that the release tool 100 is configured so that moving the release tool body 110 toward the axis line L0 along the plane M1 perpendicular to the axis line L0 of the male member 31 may cause the pair of operated portions 73, 73 of the retaining member 33 to be pressed toward the axis line L0.

As shown in FIG. 9, the distance LB3 (see FIG. 8B) between the inner surfaces of the left and right side plates 132, 132 is formed to have a length approximately equal to the outer diameter of the housing portion 53 of the female member 32, or more specifically, the outer diameter of the large-diameter cylindrical portion 53A having the largest diameter. Further, the rear ends of the left and right side plates 132, 132 are curved inward. As shown in FIG. 9, the distance LB4 (see FIG. 8B) between this pair of curved plate portions 132R, 132R is formed to have a length approximately equal to the outer diameter of the intermediate-diameter cylindrical portion 53B of the female member 32. Thus, when the release tool 100 is moved toward the axis line L0, these left and right side plates 132, 132 and the curved plate portions 132R, 132R guide the movement of the release tool 100 along the outer circumferential surfaces of the large- and intermediate-diameter cylindrical portions 53A and 53B of the female member 32.

Furthermore, as shown in FIG. 9, the distance LB5 (see FIG. 8B) between each of the left and right curved plate portions 132R, 132R and the release tool body 110 is formed to have a length approximately equal to the axial length of the large-diameter cylindrical portion 53A of the female member 32. Thus, when the release tool 100 is moved toward the axis line L0, the release tool 100 is guided along the front and rear surfaces of the large-diameter cylindrical portion 53A.

In other words, the release tool 100 is guided along the outer surface (outer circumferential surfaces, front surface, and rear surface) of the female member 32. Owing to this guidance, the release tool body 110 is guided to a position to press the pair of operated portions 73, 73 of the retaining member 33. Also, when the release tool body 110 is moved to this pressing position, the upper plate 131 comes into contact with the female member 32 to restrain further movement.

As described above, this release tool 100 includes the release tool body 110 which comes into contact with the operated portions 73, 73 of the retaining member 33 to press the operated portions 73, 73 toward the axis line L0 of the male member 31, and the upper plate 131 and the left and right side plates 132, 132 which function as guides for guiding the release tool body 110 along the outer surface of the female member 32 toward the axis line L0 of the male member 31. Accordingly, it is possible to make the operation of the release tool 100 easier as well as obtaining various effects of the first embodiment.

Moreover, the pair of side plates 132, 132 also functions as a pair of grip portions extending from the release tool body 110. Accordingly, a worker can easily perform a release operation while holding the release tool 100 with one hand.

Third Embodiment

Figure 10:
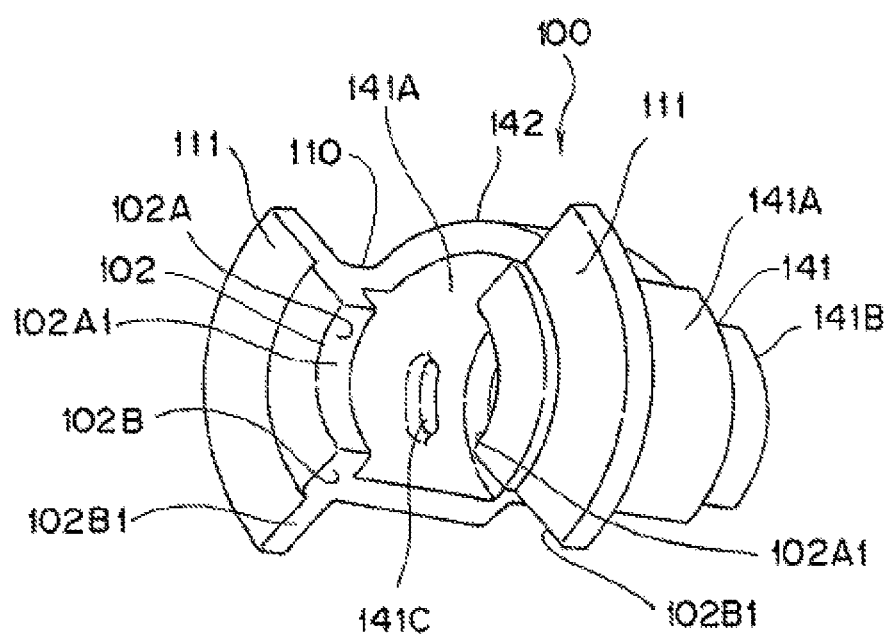
FIG. 10 is a perspective view of a release tool according to a third embodiment.
Figure 11:
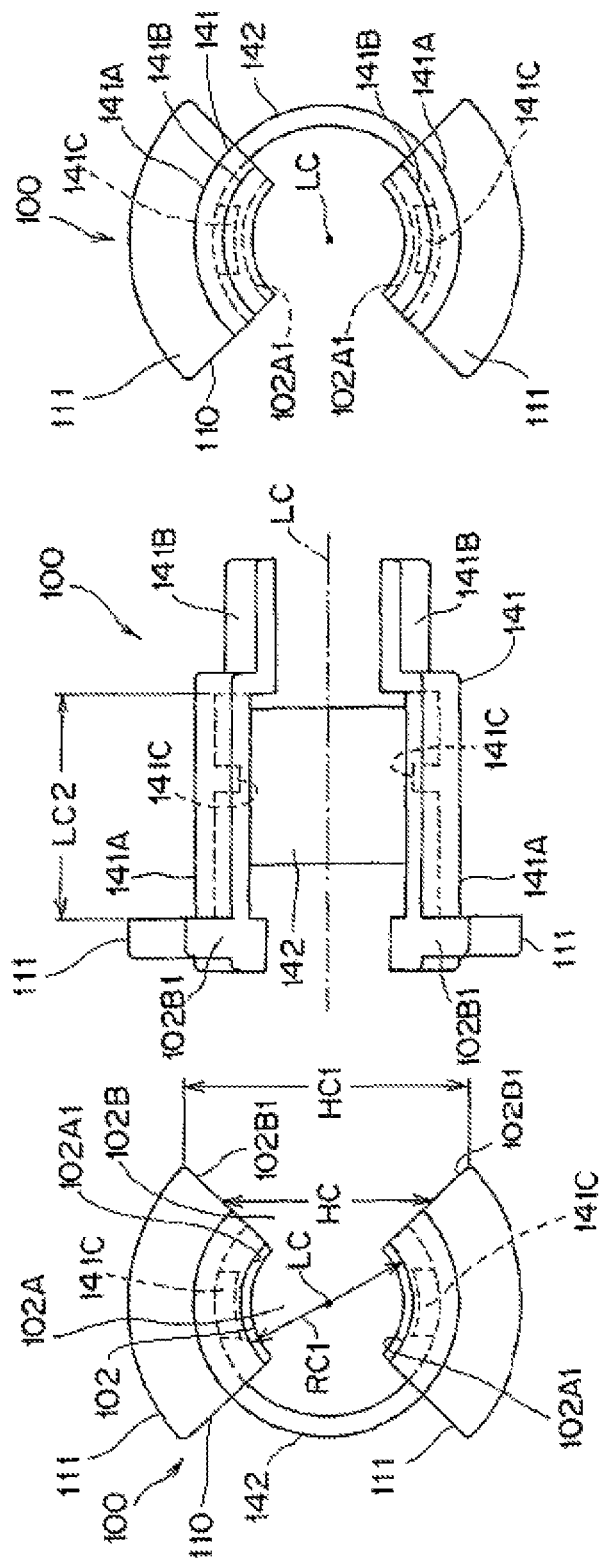
FIG. 11A is a front view of the release tool.
FIG. 11B is a bottom view thereof.
FIG. 11C is a rear view thereof.
FIG. 11D is a side view thereof.

FIG. 10 shows a perspective view of a release tool 100 according to a third embodiment. FIG. 11 shows a four-view drawing of the release tool 100. FIG. 11A shows a front view, FIG. 11B shows a bottom view, FIG. 11C shows a rear view, and FIG. 11D shows a side view. It should be noted that directions such as top, bottom, left, and right approximately correspond to directions such as top, bottom, left, and right in the drawing shown in FIG. 10.

This release tool 100 includes a release tool body 110 formed of a pair of left and right plate members, a pair of curved plate portions 141, 141 which function as guides for guiding the release tool body 110 along the outer surface of the female member 32, and a connecting portion 142 for connecting these curved plate portions 141, 141. The release tool 100 is formed of a resin component obtained by integrally forming these by resin molding.

The release tool body 110 constitutes the front surface of the release tool 100, and is formed of a pair of left and right plate members 111, 111 having a notched portion 102 opening in the vertical direction. The pair of plate members 111, 111 is formed in the shape of a sector centered at the central axis line LC of the release tool body 110.

As shown in FIG. 11A, the notched portion 102 includes a central opening portion 102A and a guide opening portion 102B. The central opening portion 102A is formed in an opening shape which is centered at the central axis line LC of the release tool body 110 and which has a diameter of RC1. The guide opening portion 102B is continuous with the central opening portion 102A, and has an opening width HC (see FIG. 11A) gradually increasing from the central opening portion 102A toward the outside (bottom) of the release tool body 110.

The diameter RC1 of this central opening portion 102A is formed to have a length corresponding to the distance L1 (see FIG. 3) between the outer side surfaces of the pair of operated portions 73, 73 in a state (state indicated by two-dot chain lines in FIG. 3) where the operated portions 73, 73 of the retaining member 33 have a decreased diameter and where the claw portions 71, 71 are not in engagement with the window portions 54, 54. In other words, the pair of inner side surfaces 102A1, 102A1 of the central opening portion 102A function as a pair of second operating portions for keeping the pair of operated portions 73, 73 in a state where the claw portions 71, 71 and the window portions 54, 54 are not in engagement with each other.

Further, the guide opening portion 102B has inner side surfaces 102B1, 102B1 which are a pair of bilaterally symmetric tapered surfaces inclining such that the opening width HC1 therebetween gradually decreases toward the central opening portion 102A. The opening width HC1 at the outermost position is formed to be larger than the distance L2 (see FIG. 3) between the outer side surfaces of the pair of operated portions 73, 73 in a state (state indicated by solid lines in FIG. 3) where the operated portions 73, 73 of the retaining member 33 have an increased diameter and where the claw portions 71, 71 are in engagement with the window portions 54, 54 (HC1>L2).

In other words, the pair of inner side surfaces 102B1, 102B1 of the guide opening portion 102B function as a pair of first operating portions for pressing the operated portions 73, 73 of the retaining member 33 to a state where the claw portions 71, 71 and the window portions 54, 54 are just about to be brought out of engagement with each other.

Thus, also in this embodiment, as in the preceding embodiments, these first and second operating portions constitute a pair of operating portions which come into contact with the operated portions 73, 73 of the retaining member 33 to gradually press these operated portions 73, 73 to a position where the claw portions 71, 71 and the window portions 54, 54 are brought out of engagement with each other.

Figure 12:
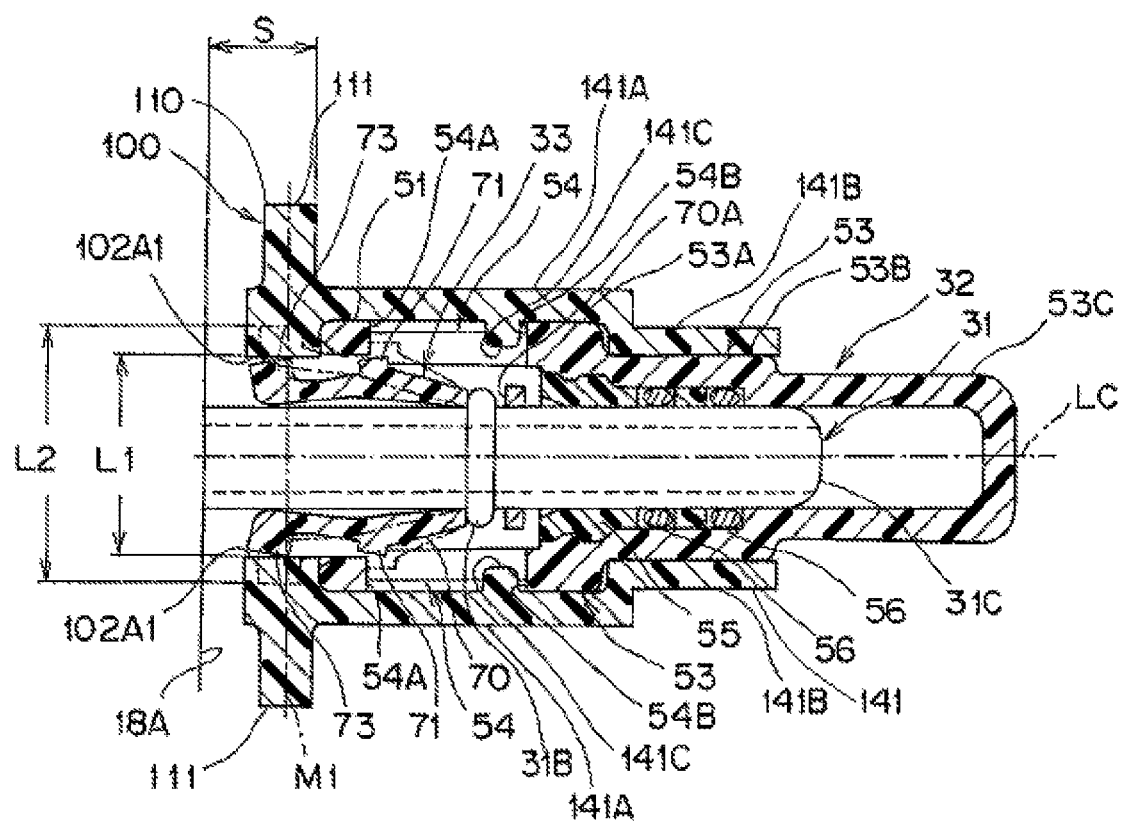
FIG. 12 is a view showing a usage state of the release tool.

FIG. 12 shows a usage state of this release tool 100. It should be noted that as shown in this drawing, the release tool 100 is configured so that moving the release tool body 110 toward the axis line L0 along the plane M1 perpendicular to the axis line L0 of the male member 31 may cause the pair of operated portions 73, 73 of the retaining member 33 to be pressed toward the axis line L0.

The pair of left and right curved plate portions 141, 141 of this release tool 100 are formed along segments of a circle centered at the axis line LC of the release tool body 110, and includes large-diameter curved plate portions 141A, 141A having a slightly larger diameter than the large-diameter cylindrical portion 53A of the female member 32, and intermediate-diameter curved plate portions 141B, 141B having an inner diameter approximately equal to the outer diameter of the intermediate-diameter cylindrical portion 53B of the female member 32.

Accordingly, when the release tool 100 is moved toward the axis line L0, the pair of large-diameter curved plate portions 141A, 141A and the pair of intermediate-diameter curved plate portions 141B, 141B guide the movement of the release tool 100 along the outer circumferential surfaces of the large- and intermediate-diameter cylindrical portions 53A and 53B of the female member 32.

Furthermore, as shown in FIG. 12, the distance LC2 (see FIG. 11B) between each of the intermediate-diameter curved plate portions 141B, 141B and the release tool body 110 is formed to have a length approximately equal to the axial length of the large-diameter cylindrical portion 53A of the female member 32. Thus, when the release tool 100 is moved toward the axis line L0, the release tool 100 is guided along the front and rear surfaces of the large-diameter cylindrical portion 53A.

In other words, the release tool 100 is guided along the outer surface (outer circumferential surfaces, front surface, and rear surface) of the female member 32. Owing to this guidance, the release tool body 110 is guided to a position to press the pair of operated portions 73, 73 of the retaining member 33. Also, when the release tool body 110 is moved to this pressing position, the connecting portion 142 comes into contact with the female member 32 to restrain further movement (pressing).

Furthermore, protrusions 141C, 141C which protrude inward to be locked in the window portions 54, 54 of the female member 32 are provided on the insides of the pair of large-diameter curved plate portions 141A, 141A, respectively. This pair of protrusions 141C, 141C are provided at such positions that when the release tool body 110 is moved to a release position to press the pair of operated portions 73, 73 of the retaining member 33 (see FIG. 12), the protrusions 141C, 141C fit into the window portions 54, 54 and are almost locked on the surfaces 54B, 54B located in the opposite axial direction from the locking surfaces 54A, 54A of the window portions 54, 54 on which the claw portions 71, 71 are locked.

Accordingly, when the release tool 100 is moved to the position (corresponding to the release position) to press the operated portions 73, 73 of the retaining member 33, the pair of protrusions 141C, 141C provided in the release tool 100 are locked in the window portions 54, 54 and can cause the release tool 100 to be held at that position. Moreover, since the pair of protrusions 141C, 141C are locked in the window portions 54, 54, respectively, the rotation of the release tool 100 with respect to the female member 32 can also be restrained.

As described above, this release tool 100 includes the release tool body 110 which comes into contact with the operated portions 73, 73 of the retaining member 33 to press these operated portions 73, 73 toward the axis line L0 of the male member 31, and the curved plate portions 141, 141 and the connecting portion 142 which function as guides for guiding the release tool body 110 along the outer surface of the female member 32 toward the axis line L0 of the male member 31. Accordingly, it is possible to make the operation of the release tool 100 easier as well as obtaining various effects of the first embodiment.

Also, since these guides include the protrusions 141C, 141C which are locked in the window portions 54, 54 of the female member 32 at a position where the engagement of the quick connector 30 is released, the positioning of the release tool 100 can be performed.

Moreover, the pair of curved plate portions 141, 141 also functions as a pair of grip portions extending from the release tool body 110. Accordingly, a worker can easily perform a release operation while holding the release tool 100 with one hand.

While the present invention has been described above based on embodiments, the present invention is not limited to these, and various design modifications can be made thereto.

For example, in the above-described embodiments, a description has been made on the case where the release tool 100 is used in a configuration in which the fuel pump 10 is attached to the top plate of the fuel tank and in which the fuel pipe 20 is connected to the fuel pump 10 through the quick connector 30 above the fuel tank, but this is not the only case. For example, the release tool 100 may be used in a configuration in which a pump through hole is formed in the bottom plate of the fuel tank so that the pump body 12 may be inserted into the tank from under the fuel tank, in which the flange portion 14 is connected to the bottom plate of the fuel tank, and in which the fuel pipe 20 is connected to the fuel pump 10 through the quick connector 30 under the fuel tank.

Further, in the aforementioned embodiments, a description has been made on the case where the release tool 100 is used when the fuel pump 10 includes the approximately cylindrical cover portion 18 protruding upward from the flange portion 14, and the male member 31 integral with the fuel pipe (fuel discharge pipe) 16 protrudes from the side wall (wall portion) 18A of this cover portion 18, but this is not the only case.

Figure 13A:
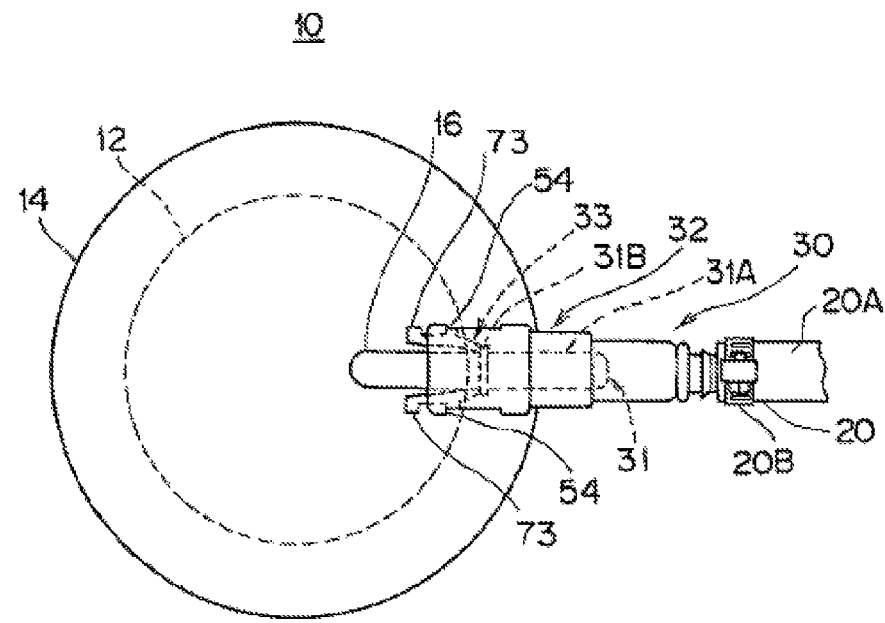
FIG. 13A is a top view showing another quick connector to which the release tool according to an embodiment of the present invention is applied, along with peripheral structures.
Figure 13B:
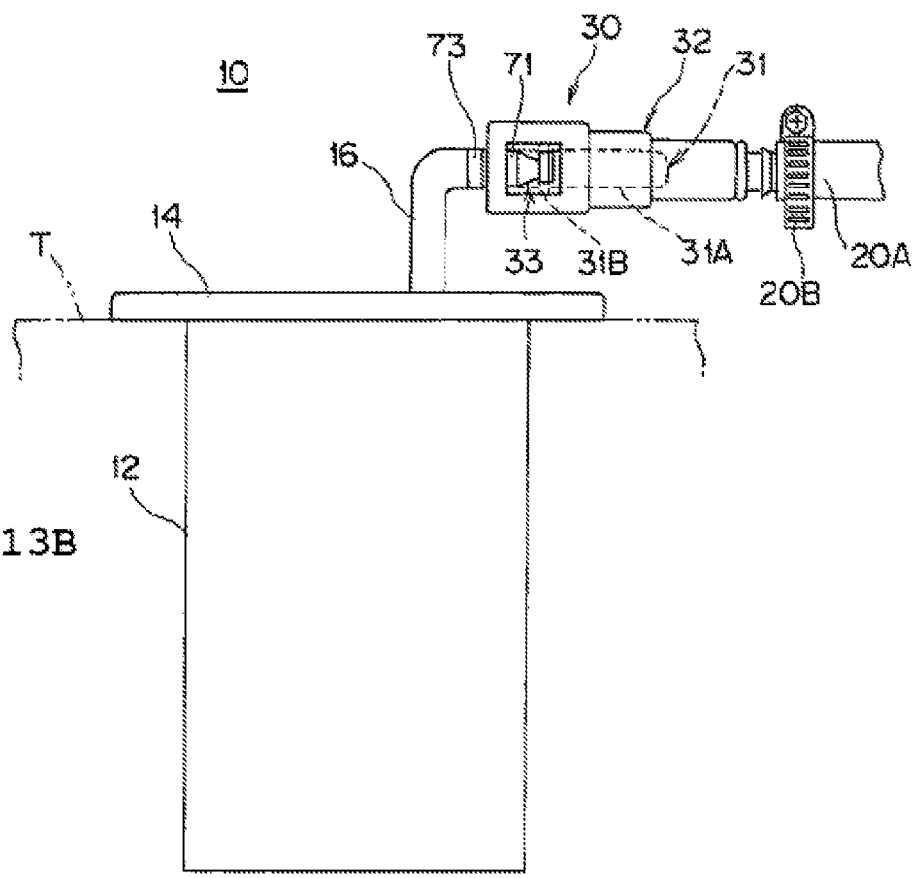
FIG. 13B is a side view thereof.

For example, the release tool 100 also be used to perform a release operation of the quick connector 30 in the case, as shown in FIGS. 13A and 13B of, where a fuel pipe (fuel discharge pipe) 16 bending approximately in the shape of L from the flange portion 14 of the fuel pump 10 is provided, and where the male member 31 is provided in a tip portion of this fuel pipe 16.

Moreover, the release tool 100 can also be used to perform a release operation of the quick connector 30 in the case, as shown in FIGS. 14A and 14B, where a fuel pipe (fuel discharge pipe) 16 linearly extending from the flange portion 14 of the fuel pump 10 is provided, and where the male member 31 is provided in a tip portion of this fuel pipe 16.

In other words, the release tool 100 can be widely applied to the release of the quick connector 30 for use in various types of installation of piping of the fuel pumps 10, and can be easily inserted into a small space to perform a release operation even when the quick connector 30 is laid out in a small space. Furthermore, this release tool 100 can be widely applied not only to the quick connector 30 for use in the installation of fuel piping but also to quick connectors for use in the installation of other piping.

Further, in the third embodiment, a description has been made on the case where the release tool 100 includes the guides for guiding the release tool body 110 along the outer surface of the female member 32 and the protrusions 141C, 141C for positioning the release tool 100. It is a matter of course that this configuration can be added to the release tools 100 of the first and second embodiments.

According to the embodiment of the present invention, the quick connector includes: a female member forming an outer cylinder; a pipe-shaped male member to be inserted into the female member; and a retaining member for fixing the male member to the female member, the male member including an annular flange portion around an outer periphery thereof, the retaining member being attached to the flange portion of the male member and including: an extending portion extending from the flange portion in the opposite direction from a tip of the male member and being elastically deformable toward and away from an axis line of the male member; an operated portion provided at an extending end of the extending portion; and a claw portion provided on the extending portion at a position closer to the flange portion than the operated portion, the female member including a window portion with which the claw portion of the retaining member comes into engagement in a state where the operated portion of the retaining member is located outside the female member when the male member is inserted into the female member, the engagement releasable by elastically deforming the operated portion of the retaining member toward the axis of the male member. The release tool is provided to come into contact with the operated portion of the retaining member to press the operated portion toward the axis line of the male member, the release tool being thus configured to release the engagement to enable the male member and the female member to be attached to and detached from each other.

According to the embodiment of this invention, the release tool is provided which comes into contact with the operated portion of the retaining member to press the operated portion toward the axis line of the male member. This release tool releases the engagement to enable the male member and the female member to be attached to and detached from each other. Accordingly, even though the operated portion is small, the operated portion can be easily accessed, and the engagement can be easily released.

In the above described configuration, the retaining member may include multiple numbers of the operated portions, and the release tool may include multiple numbers of the operating portions which come into contact with the multiple operated portions to press the operated portions toward the axis line of the male member. In this configuration, the operated portions are paired with the operating portions, and all the operated portions can be reliably operated.

Further, in the above-described configuration, the release tool may include a plate-shaped release tool body insertable toward the axis line of the male member along a plane perpendicular to the axis line of the male member, and the multiple operating portions may be formed in the release tool body. This configuration enables access to the operated portions with the release tool body having a compact and simple structure and makes it possible to easily release the engagement of the quick connector.

Moreover, in the above-described configuration, each of the operating portions may have a tapered surface which comes into contact with the corresponding operated portion and which presses the operated portion further toward the axis of the male member as the release tool moves closer to the axis of the male member. This configuration makes it possible to gradually press the operated portion toward the axis of the male member with the tapered surface and to thereby release the engagement by a simple operation.

Furthermore, in the above-described configuration, the release tool may include a grip portion which extends from the release tool body coming into contact with the operated portion of the retaining member to press the operated portion toward the axis line of the male member. This configuration can make the release tool easy to hold and can improve the operability of the release tool.

Moreover, in the above-described configuration, the release tool includes an approximately C-shaped release tool body having a notched portion opening in one direction, the notched portion opening so that the male member and the retaining member attached to the male member are insertable into the notched portion when the release tool is moved toward the axis line of the male member, the notched portion formed in such a shape that the notched portion serves as an operating portion which comes into contact with the operated portion of the retaining member to press the operated portion toward the axis line of the male member. This configuration makes it possible to reliably operate the operated portions located in the vicinity of the male member while avoiding the male member constituting part of a fuel pipe.

Further, in the above-described configuration, the release tool has a guide for guiding the release tool toward the axis line of the male member along an outer surface of the female member, and the guide includes a protrusion which is locked in the window portion of the female member at a position where the engagement is released. Accordingly, the movement of the release tool can be guided by the guide, and the release tool can be positioned at an engagement release position by the protrusion. These improve the operability of the release tool.

In the embodiment of the present invention, the release tool is provided which comes into contact with the operated portion of the retaining member to press the operated portion toward the axis line of the male member. This release tool releases the engagement to enable the male member and the female member to be attached to and detached from each other. Accordingly, the operated portion can be easily accessed, and the engagement can be easily released.

Further, the retaining member includes the multiple operated portions, and the release tool includes the multiple operating portions which come into contact with the multiple operated portions to press the operated portions toward the axis line of the male member. Accordingly, all the operated portions can be reliably operated.

Moreover, the release tool includes the plate-shaped release tool body insertable toward the axis line of the male member along a plane perpendicular to the axis line of the male member, and the multiple operating portions are formed in the release tool body. This enables access to the operated portions with the release tool body having a compact and simple structure and makes it possible to easily release the engagement of the quick connector.

Furthermore, the operating portion has a tapered surface which comes into contact with the operated portion and which presses the operated portion further toward the axis of the male member as the release tool moves closer to the axis of the male member. This makes it possible to release the engagement by a simple operation.

Also, the release tool includes a grip portion which extends from the release tool body coming into contact with the operated portion of the retaining member to press the operated portion toward the axis line of the male member. This can make the release tool easy to hold and can improve the operability of the release tool.

Further, the release tool includes an approximately C-shaped release tool body having a notched portion opening in one direction. The notched portion opens so that the male member and the retaining member attached to the male member are insertable into the notched portion when the release tool is moved toward the axis line of the male member, and is formed in such a shape that the notched portion serves as an operating portion which comes into contact with the operated portion of the retaining member to press the operated portion toward the axis line of the male member. This makes it possible to reliably operate the operated portion located in the vicinity of the male member while avoiding the male member constituting part of a fuel pipe.

Moreover, the release tool has a guide for guiding the release tool toward the axis line of the male member along an outer surface of the female member, and the guide includes a protrusion which is locked in the window portion of the female member at a position where the engagement is released. Accordingly, the movement of the release tool can be guided by the guide, and the release tool can be positioned at an engagement release position by the protrusion.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A kit comprising:
   a quick connector of a pump including:
      a female member forming an outer cylinder;
      a pipe-shaped male member extending from a side wall of the pump and configured to be inserted into the female member, the male member including an annular flange portion around an outer periphery of the male member; and
      a retaining member to be attached to the flange portion of the male member to connect the male member and the female member, the retaining member including:
         an extending portion extending from the flange portion in a direction opposite to a tip of the male member and being elastically deformable toward and away from an axis line of the male member;
         an operated portion provided at a terminal end of the extending portion; and
         a claw portion provided on the extending portion at a position closer to the flange portion than the operated portion, the female member including a window portion with which the claw portion of the retaining member comes into engagement in a state where the operated portion of the retaining member is located outside the female member when the male member is inserted into the female member, the engagement being releasable by elastically deforming the operated portion of the retaining member toward the axis line of the male member; and a release tool comprising a plate-shaped tool body having a pair of operating portions defining an opening that extends from an edge of the plate-shaped tool body toward a central portion of the plate-shaped tool body, the pair of operating portions being configured to come into direct contact with the operated portion of the retaining member to press the operated portion toward the axis line of the male member so as to release connection between the male member and the female member, the opening having a greater width at the edge than at the central portion, wherein, when the male member and the female member are in a connected state, a space is defined between the side wall and the female member, wherein the space is positioned closer to the side wall of the pump than to the window portion, wherein a thickness of the plate-shaped tool body of the release tool is smaller than the space, and wherein the quick connector can be released by inserting the plate-shaped tool body of the release tool into the space such that an inner surface of each of the operating portions directly contacts an outer surface of the operated portion within the space.

2. The kit according to claim 1, wherein the release tool includes a plurality of the pairs of operating portions which are configured to come into contact with a plurality of operated portions of the retaining member to press the operated portions toward the axis line of the male member.

3. The kit according to claim 2,
wherein the plate-shaped tool body of the release tool is configured to be insertable toward the axis line of the male member along a plane perpendicular to the axis line of the male member, and
wherein the plurality of pairs of operating portions are formed in the release tool body.

4. The kit according to claim 1, wherein each of the operating portions has a tapered surface that is configured to come into contact with a corresponding operated portion and that is configured to press the operated portion further toward the axis line of the male member as the release tool moves closer to the axis line of the male member.

5. The kit according to claim 1, wherein the release tool includes a grip portion which extends from the release tool body and is configured to come into contact with the operated portion of the retaining member to press the operated portion toward the axis line of the male member.

6. The kit according to claim 1, wherein the plate-shaped tool body forms an approximately C-shaped release tool body having a notched portion that defines the opening in one direction, the opening being configured so that the male member and the retaining member attached to the male member are insertable into the notched portion when the release tool is moved toward the axis line of the male member, the notched portion being formed in such a shape that the notched portion serves as the pair of operating portions and is configured to come into contact with the operated portion of the retaining member to press the operated portion toward the axis line of the male member.

7. The kit according to claim 1, wherein the release tool has a guide configured to guide the release tool toward the axis line of the male member along an outer surface of the female member, the guide including a protrusion which is configured to lock in the window portion of the female member at a position where the engagement is released.

8. A kit comprising:
a quick connector of a pump including:
a female member forming an outer cylinder;
a pipe-shaped male member extending from a side wall of the pump and configured to be inserted into the female member, the male member including an annular flange portion around an outer periphery of the male member; and
a retaining member to be attached to the flange portion of the male member to connect the male member and the female member, the retaining member including:
an extending portion extending from the flange portion in a direction opposite to a tip of the male member and being elastically deformable toward and away from an axis line of the male member;
an operated portion provided at a terminal end of the extending portion; and
a claw portion provided on the extending portion at a position closer to the flange portion than the operated portion, the female member including a window portion with which the claw portion of the retaining member comes into engagement in a state where the operated portion of the retaining member is located outside the female member when the male member is inserted into the female member, the engagement being releasable by elastically deforming the operated portion of the retaining member toward the axis line of the male member; and a release tool comprising a plate-shaped tool body having a pair of operating portions defining an opening that extends from an edge of the plate-shaped tool body toward a central portion of the plate-shaped tool body, the pair of operating portions being configured to come into direct contact with the operated portion of the retaining member to press the operated portion toward the axis line of the male member so as to release connection between the male member and the female member, the opening having a greater width at the edge than at the central portion, wherein, when the male member and the female member are in a connected state, a space is defined between the side wall and the female member in a direction parallel to the axis line of the male member, wherein a thickness of the at least one operating portion of the plate-shaped tool body in the direction parallel to the axis line of the male member is smaller than the space in the direction parallel to the axis line of the male member, and wherein the quick connector can be released by inserting the plate-shaped tool body of the release tool into the space such that an inner surface of each of the operating portions directly contacts an outer surface of the operated portion within the space.

9. The kit according to claim 8,
wherein the release tool includes a plurality of the pairs of operating portions which are configured to come into contact with a plurality of operated portions of the retaining member to press the operated portions toward the axis line of the male member,
wherein the plate-shaped tool body of the release tool is configured to be insertable toward the axis line of the male member along a plane perpendicular to the axis line of the male member, and wherein the plurality of pairs of operating portions are formed in the release tool body.

10. The kit according to claim 8, wherein each of the operating portions has a tapered surface that is configured to come into contact with a corresponding operated portion and that is configured to press the operated portion further toward the axis line of the male member as the release tool moves closer to the axis line of the male member.

11. The kit according to claim 8, wherein the release tool includes a grip portion which extends from the release tool body and is configured to come into contact with the operated portion of the retaining member to press the operated portion toward the axis line of the male member.

12. The kit according to claim 8, wherein the plate-shaped tool body forms an approximately C-shaped release tool body having a notched portion that defines the opening in one direction, the opening being configured so that the male member and the retaining member attached to the male member are insertable into the notched portion when the release tool is moved toward the axis line of the male member, the notched portion being formed in such a shape that the notched portion serves as the operating portion and is configured to come into contact with the operated portion of the retaining member to press the operated portion toward the axis line of the male member.

13. The kit according to claim 8, wherein the release tool has a guide configured to guide the release tool toward the axis line of the male member along an outer surface of the female member, the guide including a protrusion which is configured to lock in the window portion of the female member at a position where the engagement is released.

\* \* \* \* \*